Dec. 12, 1961 A. T. STARR 3,013,192

SEMICONDUCTOR DEVICES

Filed Dec. 12, 1958 4 Sheets-Sheet 1

*Inventor*
A.T. STARR
By [signature]
*Attorney*

*Inventor*
A.T. STARR
*By* R. P. Morris
*Attorney*

Dec. 12, 1961 A. T. STARR 3,013,192

SEMICONDUCTOR DEVICES

Filed Dec. 12, 1958 4 Sheets-Sheet 3

*Inventor*
A.T. STARR
*By* R. P. Morris
*Attorney*

Inventor
A.T. STARR
By R.P. Morris
Attorney

United States Patent Office 3,013,192

Patented Dec. 12, 1961

3,013,192

SEMICONDUCTOR DEVICES

Arthur Tisso Starr, London, England, assignor to International Standard Electric Corporation, New York, N.Y., a corporation of Delaware Filed Dec. 12, 1958, Ser. No. 780,082
Claims priority, application Great Britain Jan. 3, 1958
5 Claims. (Cl. 317—235)

This invention relates to improvements in or relating to semi-conductor junction devices and their methods of manufacture.

It is the main object of this invention to provide semi-conductor devices having improved frequency response characteristics.

According to one aspect of the invention there is provided a semi-conductor junction device in which all the layers of semi-conductor material are polycrystalline.

According to another aspect of the invention there is provided a method of making a semi-conductor junction device which consists of alternately evaporating in a high vacuum, an acceptor impurity or a donor impurity from separate sources simultaneously with a semi-conductor material from another source so that there is formed, one on top of the other, a plurality of layers of polycrystalline semi-conductor material the conductivity types of which are different from layer to layer.

According to a further aspect of the invention there is provided a semi-conductor junction diode comprising a conductive metal plate constituting a first connection thereto, a first layer of polycrystalline semi-conductor material of P-type conductivity deposited on a major portion of one surface of the said metal plate in low resistance contact therewith, a second layer of polycrystalline semi-conductor material of N-type conductivity deposited on a face of said first layer remote from said metal plate so as to provide a PN junction between their contiguous faces, a layer of gold deposited in substantial contact with the face of said second layer remote from said PN junction, a second connection constituted by a gold-plated metal member, having an integral lug extending therefrom, and welded to said layer of gold in low resistance contact, and a coating of insulating material covering the device with the exception of said lug and a portion of the said metal plate remote from the said first layer.

According to yet a further aspect of the invention there is provided a semi-conductor junction transistor comprising a metal collector plate having on the major portion of one surface thereof, a first layer of polycrystalline semi-conductor material of P type conductivity in low resistance contact therewith, a second layer of polycrystalline semi-conductor material of N type conductivity deposited on a major portion of the face of said first layer remote from said metal collector plate to provide a first PN junction between their contiguous faces, a gold plated metal lug located on a portion of a face of said second layer remote from said first PN junction and maintained in contact with said portion by a ring of gold deposited on said remote face and over the said metal lug, said ring and metal lug constituting a base connection to said second layer in low resistance contact therewith, a ring of insulating material deposited on said plate, first and second layers, said ring and part of the lug so as to leave a major portion of the surface of said second layer remote from the first PN junction exposed, a third layer of polycrystalline semi-conductor material of P type conductivity deposited on said exposed major portion of the second layer so as to provide a second PN junction between their contiguous faces, a layer of gold deposited on the face of said third layer remote from the second junction, and an emitter connection constituted by a gold-plated member having an integral lug extending therefrom and welded to said layer of gold in low resistance contact therewith, and a coating of insulating material covering the device with the exception of base and emitter connection lugs and a portion of the said collector plate remote from the said first layer.

All currently manufactured transistors and diodes, with the exception of the well known type of polycrystalline diode used as a microwave receiver mixer, are made of a single crystal germanium or silicon. The reasons given for using a single crystal are usually stated as designability and uniform response to metallurgical and chemical processes. The characteristics of polycrystalline material differ in many respects to those of a single crystal, however, most of the electrical characteristics would be of the same order in a polycrystalline material except that the lifetime of the minority carriers would be greatly reduced by a factor of say 10 to 100, that is to say that the mobilities and conductivity will be as in a single crystal except that the lifetime is greatly reduced.

The effect of decreasing the lifetime is as follows:

In a diode the shape of the characteristic of current versus voltage is independent of the material within the range of breakdown as it is merely given by the factor (exp. $(lV/KT)$−1)

where:

$V$=voltage
$K$=Boltzmann's constant
$T$=absolute temperature
$l$=electronic charge The scale of the characteristic is given by the reverse saturation current I$s$ which is equal to:

$$Is = A\sqrt{KTl}\, n_1^{2}\left(\frac{1}{\mathrm{n}}\frac{\mu\mathrm{p}}{\mathrm{p}}\,\frac{1}{\mathrm{P}}\frac{\mu\mathrm{n}}{\mathrm{n}}\right)$$

where:

$\mu p$=mobility of holes in the N region.
$p$=average lifetime of holes in the N region.
$\mu n$=mobility of electrons in the P region.
$n$=lifetime of electrons in the P region.

If therefore the lifetimes are reduced by a factor K, say, I$s$ is increased by a factor $\sqrt{K}$. Keeping the same characteristic, the area of the diode can therefore be reduced by a factor $\sqrt{K}$, hence also is its capacitance, in consequence the diode will work at higher frequencies ($\sqrt{K}$ times higher). There is also an additional improvement due to the decreased time of storage of excess carriers. A considerable improvement at high frequencies occurs as a result of the foregoing.

In a transistor a similar improvement at high frequencies occurs; but there will be a degraduation due to the recombination of the excess carriers as they pass through the base region. To neutralise the latter effect it is necessary to reduce the base width by a factor $\sqrt{K}$.

Devices produced on the basis of the principles outlined herein are now to be described with reference to the following drawings in which.

Figures 1, 2, 3, 4, 5:
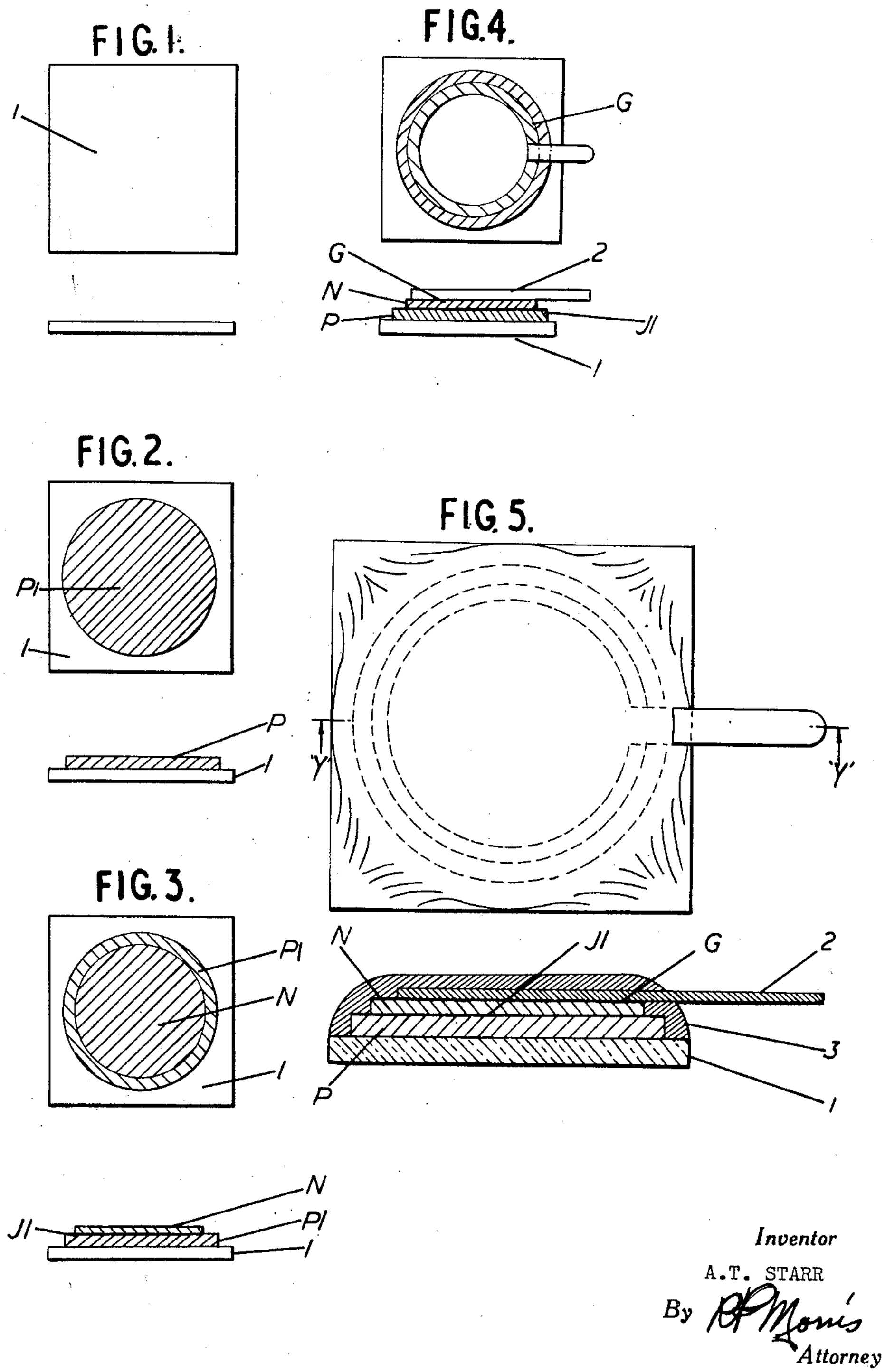
FIG. 1 shows the basic piece-part of the devices described herein.
FIG. 2 shows the first stage of processing in the production of a junction diode.
FIG. 3 shows the second stage of processing following that shown in FIG. 2.
FIG. 4 shows the third stage of processing following that shown in FIG. 3.
FIG. 5 shows a completely processed junction diode.

In FIG. 1, there is shown a plan and elevation of a gold-plated copper plate 1, which constitutes the basic piece-part of the devices and their methods of manufacture to be described herein.

FIG. 2 shows a plan and elevation of the plate after the first stage of processing in the production of a junction diode. The circular shaded area designated P1, is a disc shaped layer of polycrystalline silicon of P type conductivity in low resistance contact with the plate 1, which constitutes one connection to the device. The layer P1 is deposited onto the plate 1, by simultaneously evaporating intrinsic silicon and an accepter impurity such as indium from separate vaporizers in a high vacuum. Deposition takes place through a suitable shaped mask which may take the form of a square plate with a centrally disposed hole, the diameter of which is equal to the required diameter of the disc shaped layer P1.

FIG. 3 shows the plan and elevation of a smaller and thinner disc like layer N, of semiconductor material of N type conductivity deposited on the P1 type layer in a like manner to that described for depositing the P1 type layer on to the plate 1. However, in this case a donor impurity such as antimony is simultaneously evaporated with the intrinsic polycrystalline silicon from a separate source. In consequence of the evaporation of the second layer onto the first, a PN junction J1 results. A second connection to the device is constituted by a gold-plated metal member having an extending portion in the form of a lug to act as a terminal. In order to attach the second connection to the P1 layer in low resistance contact, it is necessary in the first instance to deposit a layer of gold by evaporisation onto the top surface of the P type layer, this gold layer G is shown in plan elevation views of the part manufactured diode in FIG. 4. The second connection designated 2, is located in a central position on the gold surface and its attachment thereto is accomplished by, for example, passing an electric current through it of such a value and duration that the gold coating on the ring flows to weld it to the gold layer. Referring to the finished diode shown in plan and sectional elevation in FIG. 5, it will be seen that an insulating layer of suitable insulating material is finally deposited by evaporisation over all the exposed top surfaces of the plate 1, the P1 and N layers and the second connection. The extending portion being suitably masked during this process to prevent it being covered by the insulant.

Figure 6:
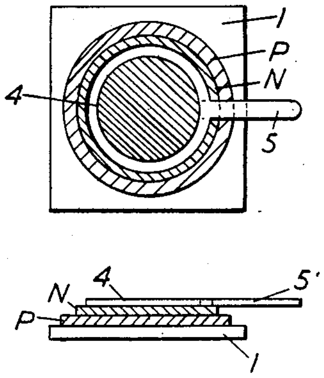
FIG. 6 shows a stage in the production of a PNP junction transistor utilising the device made in the first and second stages of production of a junction diode.
Figure 8:
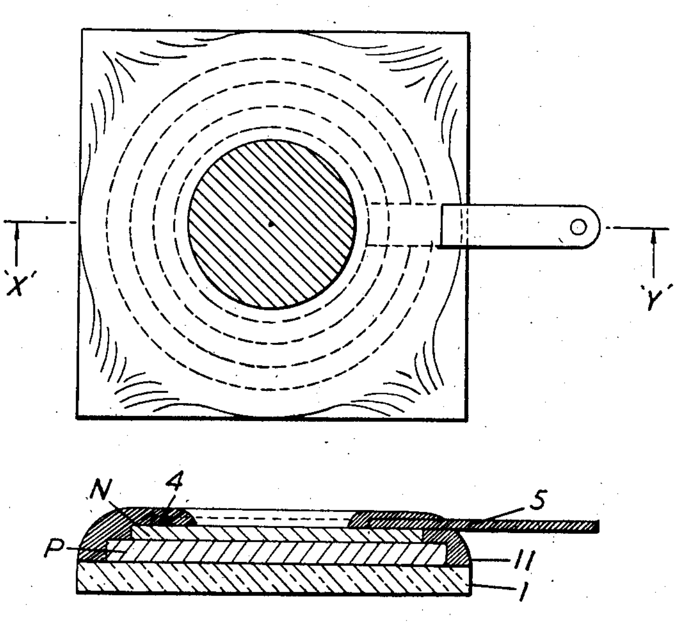
FIGS. 8 and 9 show a further stage in the production of PNP junction transistor.

The preliminary stages of manufacture of a junction transistor are exactly the same, up to and including deposition of the second layer of N type conductivity, as those for the manufacture of the junction diode just described. However, in this device the second connection is replaced by a base connection which is constituted by a ring of gold and a gold-plated metal lug. The ring of gold is evaporated on to the second layer of N type conductivity as shown in the plan and sectional elevation of the part manufactured device in FIG. 6. Before evaporation of the ring 4, the lug 5, is rigidly located onto the N type layer in the position shown, and gold is evaporated onto both of them through a two-piece mask of the type shown in FIG. 7 in plan, and in sectional elevation on the "Y"—"Y" axis looking in the direction of the arrows. The mask consists of a major mask designated 6, similar to the shape of the mask previously described, except that a channel 8, is cut from the central hole to one of the sides, this channel is positioned such that it clears the prepositioned lug. The minor mask is constituted by a circular disc of material designated 7, having a diameter smaller than, and concentric with, the hole in the major mask. The clear area between them defines the area through which the gold will be evaporated onto the N type layer and part of the lug. Two bridge pieces 9 and 10 are fitted to the major and minor masks in order to hold them in concentric alignment and to ensure the free passage of the gold through the clear areas between them during the evaporation process. It will be readily understood that gold will be deposited over the lug via the channel as well as the exposed area of the N type layer and in consequence a low resistance contact between the lug and the ring of gold will result. A third evaporation stage is carried out to evaporate a suitable insulant or a ring of magnesium fluoride over exposed peripheral areas of the P1 and N layers, the collector plate and part of the lug. In FIG. 8 there is shown a plan and sectional elevation of the device after deposition of a magnesium fluoride layer 11 by evaporation. In the plan view the hatched circular area is representative of an area of the N type layer over which a mask is located to prevent deposition of the magnesium fluoride. A smaller tubular mask is placed over the lug 5, in the area defined by the full lines in the plan view in order to prevent deposition of the magnesium fluoride taking place over that part of the lug also. A further stage of evaporation is carried out to produce a second layer P2, of P type conductivity on the N layer as shown in the plan and sectional elevation constituting FIG. 9. Again as in the case of the first P type layer, polycrystalline silicon and an acceptor impurity such as aluminium are simultaneously evaporated from separate sources. The resulting PN junction between contiguous faces of the N layer and the second layer P2, is designated J2. If reference is made to the plan and sectional elevation of the completed transistor shown in FIG. 10, it will be seen that a gold layer G is deposited, by evaporation, onto the upper surface of the P2 layer. An emitter connection, constituted by a gold-plated metal member 12 with integral extending lug 13, is located centrally on the gold layer and welded in low resistance contact thereto by the method described for attaching the connection to N type layer in the junction diode. If it is required the whole of the device, with the exception of the under side of the collector plate, the extending lug of the emitter connection, and the lug of the base connection, may be covered with a suitable insulating material (not shown).

Figures 9, 10:
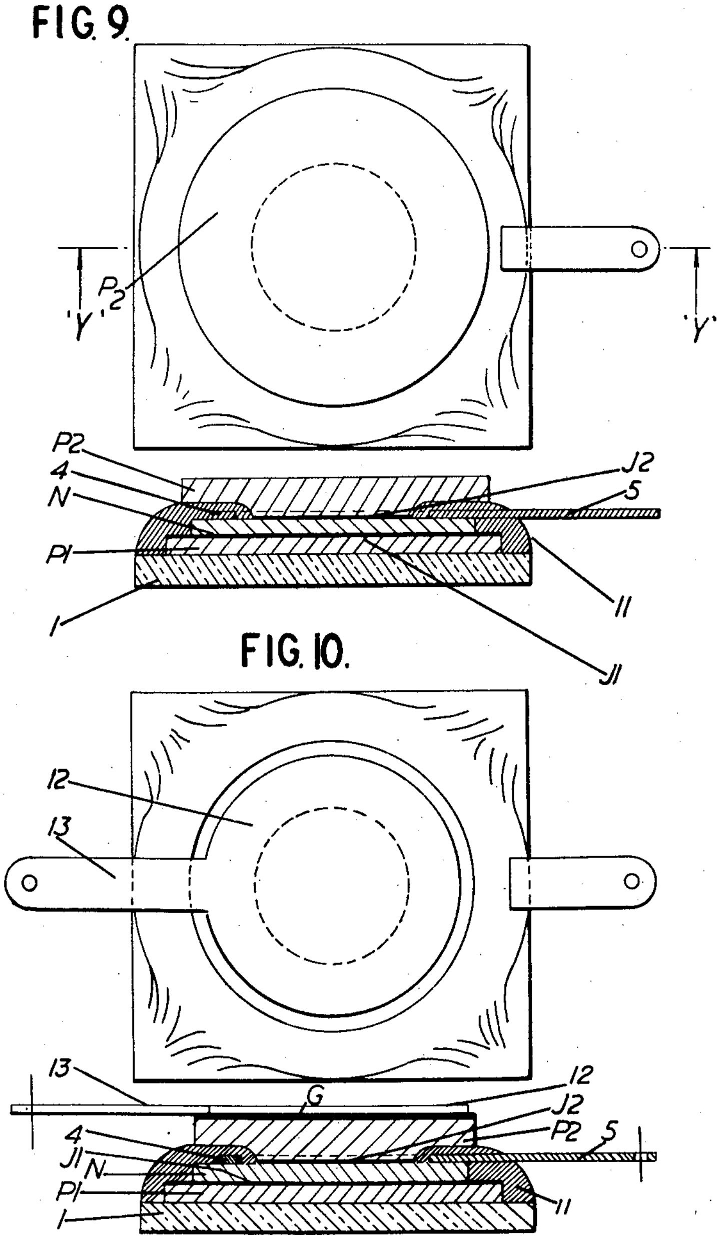
FIG. 10 shows a completed PNP junction transistor.
Figures 7, 11, 12:
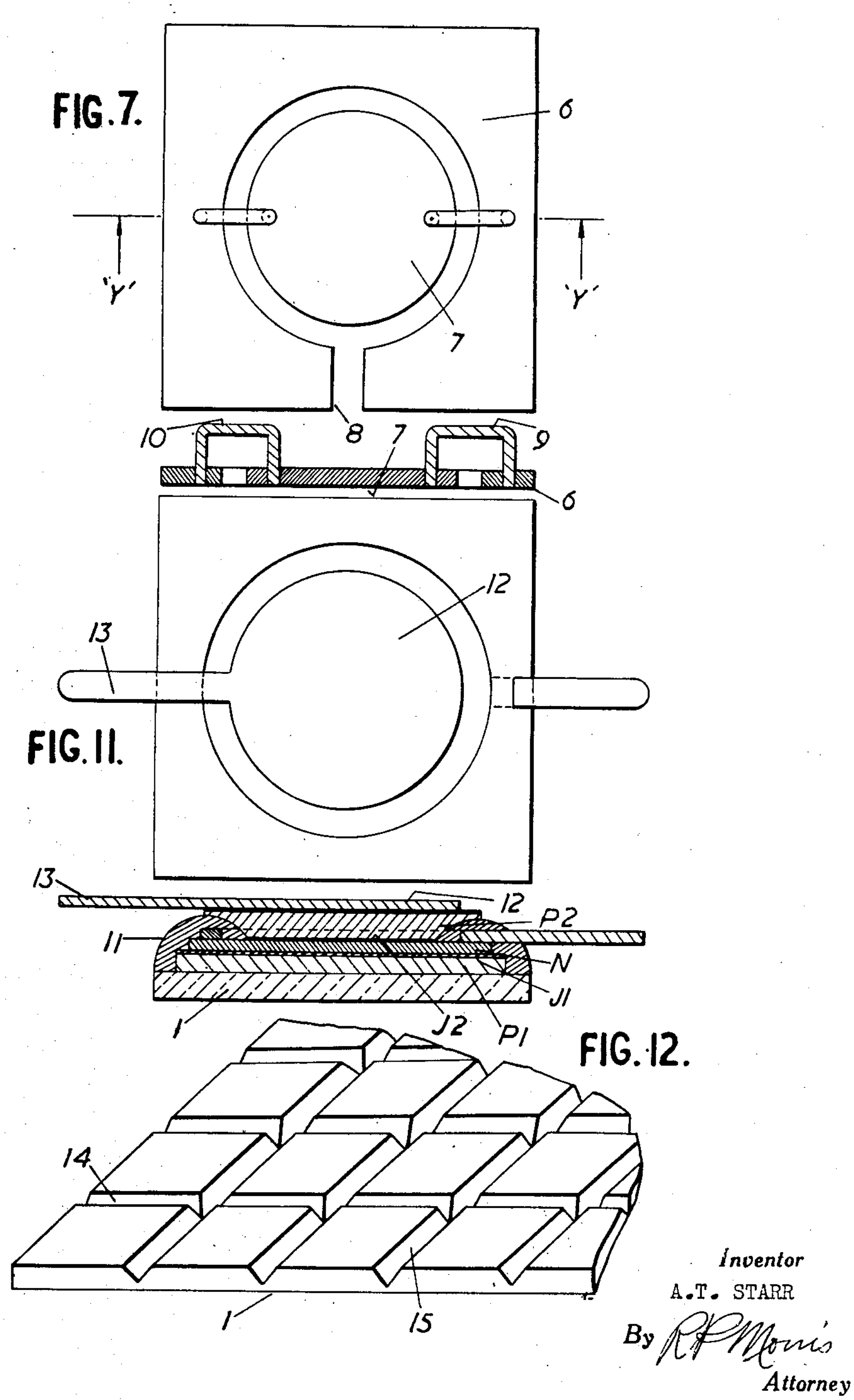
FIG. 7 shows a masking arrangement used in the stage of production shown in FIG. 6.
FIG. 11 shows a completed PNIP junction transistor utilising a PNP junction transistor shown in FIG. 10 with the inclusion of an I layer between one of the P and N layers.
FIG. 12 shows a single large metal plate with transverse indentations from which a plurality of the devices of the invention may be made together.

A variation in the construction of the transistor shown in FIG. 10, can produce a device of PNIP configuration such as that shown in the plan and sectional elevation of FIG. 11.

The construction is almost identical with the PNP transistor shown in FIG. 10 with the exception of a film of magnesium fluoride J1, between the collector and base zones i.e. deposited over the P1 layer by evaporation to provide the I layer before evaporation of the N layer. Whilst magnesium fluoride is considered as an insulant under normal circumstances, it can however (as a film between the base and collector zones) be induced to pass holes to the collector when there is a strong electric field set up by the collector bias. The insulating ring 11 deposited over the peripheral areas of the collector plate 1, P1, I, N and the base electrode may be of a suitable insulating material or of magnesium fluoride. Due to its disposition with respect to the collector plates and the various layers it will continue to act as an insulating medium.

Intrinsic polycrystalline silicon may be used to produce the I film between the P1 and N layers instead of magnesium fluoride, again such a film would be deposited by an evaporation process.

Whilst constructions and methods of producing the devices described herein have been described with reference to the evaporation of polycrystalline silicon, polycrystalline germanium may well be utilised in its place. Monocrystalline silicon or germanium may also be utilised if required.

The processes herein have been described with reference to a single device but it will be obvious that a considerable number of devices can be made together through the various stages, by the use of multiple masks over a single large metal plate having transverse indentations of V form at right angles to each other to divide the plate into a number of small sections of equal area. The indentations would be formed by punch press and deep enough through the thickness of material such that only a very small thickness remains to hold the section together. After full processing to provide the devices, each section could be broken off the main plate without difficulty. A section of a plate of this type is shown in FIG. 12, the transverse indentations at right angles to each other are designated 14 and 15.

While the principles on the invention have been described above in connection with specific apparatus, it is to be clearly understood that this description is made only by way of example and not as a limitation on the scope of the invention.

While the principles of the invention have been described above in connection with specific apparatus, it is to be clearly understood that this description is made only by way of example and not as a limitation on the scope of the invention.

What we claim is:

1. A semi-conductor junction diode comprising a conductive metal plate constituting a first connection thereto, a first layer of polycrystalline semi-conductor material of P type conductivity deposited on a major portion of one surface of the said metal plate in low resistance contact therewith, a second layer of polycrystalline semi-conductor material of N type conductivity deposited on a face of said first layer remote from said metal plate so as to provide a PN junction between their contiguous faces, a layer of gold deposited in low resistance contact with the face of said second layer remote from said PN junction, a second connection constituted by a gold-plated metal member having an integral lug extending therefrom, and welded to said layer of gold in low resistance contact, and a coating of insulating material covering the device with the exception of said lug and a portion of the said metal plate remote from the said first layer.

2. A semi-conductor junction transistor comprising a metal collector plate having on the major portion of one surface thereof, a first layer of polycrystalline semi-conductor material of P type conductivity in low resistance contact therewith, a second layer of polycrystalline semi-conductor material of N type conductivity deposited on a major portion of the face of said first layer remote from said metal collector plate to provide a first PN junction between their contiguous faces, a gold plated metal lug located on a portion of a face of said second layer remote from said first PN junction and maintained in contact with said portion by a ring of gold deposited on said remote face and over the said metal lug, said ring and metal lug constituting a base connection to said second layer in low resistance contact therewith, a ring of insulating material deposited on said plate, first and second layers, said ring and part of the lug so as to leave a major portion of the surface of said second layer remote from the first PN junction exposed, a third layer of polycrystalline semi-conductor material of P type conductivity deposited on said exposed major portion of the second layer so as to provide a second PN junction between their contiguous faces, a layer of gold deposited on the face of said third layer remote from the second junction, and an emitter connection constituted by a gold-plated member having an integral lug extending therefrom, and welded to said layer of gold in low resistance contact therewith, and a coating of insulating material covering the device with the exception of base and emitter connection lugs and a portion of the said collector plate remote form the said first layer.

3. A semi-conductor junction transistor as claimed in claim 2 comprising a film of intrinsic polycrystalline semi-conductor material intermediate the adjacent faces of said second and third layers of N and P type conductivity respectively to form an intrinsic layer in place of said second PN junction.

4. A semi-conductor junction transistor as claimed in in claim 2 comprising a film of material normally having insulating characteristics intermediate the adjacent faces of said second and third layers of N and P type conductivity respectively to form an intrinsic layer in place of said second PN junction.

5. A semiconductor junction device comprising:

a first polycrystalline semiconductor layer of one conductivity type, a second polycrystalline semi-conductor layer of the opposite conductivity type and a film of magnesium fluoride positioned between said layers.

References Cited in the file of this patent

UNITED STATES PATENTS

| | | |
|---|---|---|
| 2,789,068 | Maserjian | Apr. 16, 1957 |
| 2,793,145 | Clarke | May 21, 1957 |
| 2,877,358 | Ross | Mar. 10, 1959 |
| 2,887,628 | Zierdt | May 19, 1959 |
| 2,894,862 | Mueller | July 14, 1959 |
| 2,898,247 | Hunter | Aug. 4, 1959 |
| 2,921,362 | Nomura | Jan. 19, 1960 |